United States Patent [19]

Gregg et al.

[11] Patent Number: 5,944,797
[45] Date of Patent: Aug. 31, 1999

[54] DATA MOVER HARDWARE CONTROLLED PROCESSING IN A COMMANDING SYSTEM AND IN A COMMANDED SYSTEM FOR CONTROLLING FRAME COMMUNICATIONS ON A LINK

[75] Inventors: Thomas Anthony Gregg, Highland; Kulwant Mundra Pandey, Lagrangeville, both of N.Y.

[73] Assignee: International Business Machines Corporation, Armonk, N.Y.

[21] Appl. No.: 08/864,583

[22] Filed: May 28, 1997

[51] Int. Cl.$^6$ .................................................. G06F 13/00
[52] U.S. Cl. ................................................................ 709/237
[58] Field of Search .................... 395/200.38, 200.64, 395/200.67, 876; 711/170

[56] References Cited

U.S. PATENT DOCUMENTS

| | | | |
|---|---|---|---|
| 5,003,558 | 3/1991 | Gregg .................................. | 375/108 |
| 5,025,458 | 6/1991 | Casper et al. ....................... | 375/114 |
| 5,220,663 | 6/1993 | Bauchot et al. .................... | 395/575 |
| 5,247,520 | 9/1993 | Geise et al. ......................... | 370/94.1 |
| 5,410,655 | 4/1995 | Greenfield et al. ................ | 395/275 |
| 5,412,803 | 5/1995 | Bartow et al. ...................... | 395/575 |
| 5,559,963 | 9/1996 | Gregg et al. ........................ | 395/200.13 |
| 5,561,809 | 10/1996 | Elko et al. .......................... | 395/800 |

Primary Examiner—Lance Leonard Barry
Attorney, Agent, or Firm—Marc A. Ehrlich; Bernard M. Goldman

[57] ABSTRACT

The present invention significantly reduces or eliminates the involvment of central processors in the message block handling of received communication-link responses within a Central Processing Complex (CPC). When a commanding system sends a command, it must receive a response frame from the commanded system indicating if the command was correctly received or not. A significant amount of time is required for the commanding system processor to move the received response frame from a receiving link buffer to an area in the CPC memory. The preferred embodiment avoids the need for having a commanding system processor either wait for or be interrupted to handle the response frame. The preferred embodiment provides advanced preparation of a data mover in a manner to enable the data mover in the computer system to handle the reception of each response frame without involving the commanding system processor. The commanding system is signalled by the data mover on the completion of the response handling to make the completion of each command known to the program which issued the command.

3 Claims, 9 Drawing Sheets

DATA MOVER HARDWARE CONTROLLED PROCESSING IN A COMMANDING SYSTEM AND IN A COMMANDED SYSTEM FOR CONTROLLING FRAME COMMUNICATIONS ON A LINK

FIELD OF THE INVENTION

The present invention generally relates to data communications links between computer environments having one or more central processing complexes (CPCs). Each CPC also has the option of operating on either independent data or shared data, and the inter-CPC sharing of data uses an electronic storage, called a coupling facility (CFs). This invention is particularly related to high speed data communications essential for efficiently using the CF in operations requiring the sharing of data between the CPCs, and deals with CPC commands for sending data and receiving responses from a CF.

INCORPORATION BY REFERENCE

The descriptions set forth in the following co-pending application(s) are hereby incorporated into the present application by this reference:

U.S. application Ser. No. 08/147,697, now U.S. Pat. No. 5,706,432

U.S. application Ser. No. 08/788,755, filed Jan. 24, 1997

U.S. Pat. No. 5,339,405

U.S. Pat. No. 5,331,673

U.S. Pat. Nos. 5,003,558 and 5,025,458 which relate to a channel for for synchronizing and decoding of serial data transmission.

BACKGROUND OF THE INVENTION

Communication between computer systems usually involves a commanding system sending a command to a commanded system. Sometimes the command causes data to be transmitted either from the commanding system to the commanded system (a write operation) or from the commanded system to the commanding system (a read operation). Whether any data is transmitted or not, the commanded system always sends a response back to the commanding system that describes the ending state of the command.

In prior systems, any central processor (CPU) or support auxiliary processor (SAP) in the system (CPC) sent command signals to its intersystem channel to send a message to another processor coupled to the commanding system. The intersystem channel in turn did processing operations for the command, including sending the command over a channel link to a coupling facility (CF). The CF contains a processor for processing received frames of control information and optional data information it receives from or transmits to the CPC. After the commanded system (e.g. CF) processes the command (and receives/sends any data associated with the command), it sends a response back to the commanding system (e.g. CPC) to indicate the status of the receiving system in regard to its command operations. When the response status signals (response) are received at the commanding system, the CPU sending the command handles the response. The accepting CPU's instruction stream in the CPC must be interrupted for that CPU to handle the response. When interrupted, the accepting CPU then sends another command to the intersystem channel instructing it on where and how to store the received response into a communication area in the commanding systems main memory (i.e. CPC shared storage), and these operations take a significant amount of time. Sometimes commands and/or responses need to be retransmitted due to failures in the initial transmissions; and any such retransmission of a command and/or response has involved similar acceptance and interruption overhead by a CPU which accepts the burden of being interrupted to handle the retransmission of the response from the CF.

Delay is introduced in the overall execution of commands by the central processors when they are interrupted (or polled) for acceptance and handling of a response received by an intersystem channel. A significant amount of potential processor power is consumed in accepting, waiting, processing and moving a response between a CPC's intersystem storage and the CPC's main memory.

SUMMARY OF THE INVENTION

The subject invention provides a hardware/microcode implementable method that significantly reduces communication delays and decreases the central processor burden required for supporting link communications with another system unit (e.g. CF) over an intersystem channel by significantly reducing or eliminating the involvment of the central processors in the movement within the CPC of received communication-link responses, wherein each CPC-received intersystem response (e.g. from a CF to a CPU command) is moved from intersystem channel storage to CPC storage (system main memory).

The present invention uses a system and method for transmitting commands and receiving responses between two computing systems. When the commanding system sends a command, it sends signals to the intersystem channel instructing it to transmit the command from a predetermined location within the commanding system's main memory. The signals sent to the intersystem channel specify a main memory address for the intersystem channel to use for the returned response when it is later received.

Later, when the response is received from the commanded system, the intersystem channel uses the address specified earlier by the central processor to store the response in the commanding system's main memory. Only after the response has been successfully stored does the intersystem channel alert the central processor through either an interrupt or a polling mechanism.

When bit errors are detected on the link, it is a requirement of the link protocols to resend either the command or the response, depending on which one had the error. It is yet another objective of the present invention to provide a mechanism of resending a damaged command and/or response without intervention by any of the central processors.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

DESCRIPTION OF THE DETAILED EMBODIMENT

The preferred embodiment is described in the following three parts: A, B, and C. The first part A describes the link protocols used to transmit messages between computers. The second part B describes the message passing hardware and operation of the central processing complex (CPC), which is the system issuing a command. The last part C describes recovery from link bit errors.

The term "address" is herein used to mean a field used by a processor instruction for designating a location in a memory, and includes real, virtual, direct, or indirect addresses.

Figure 1:
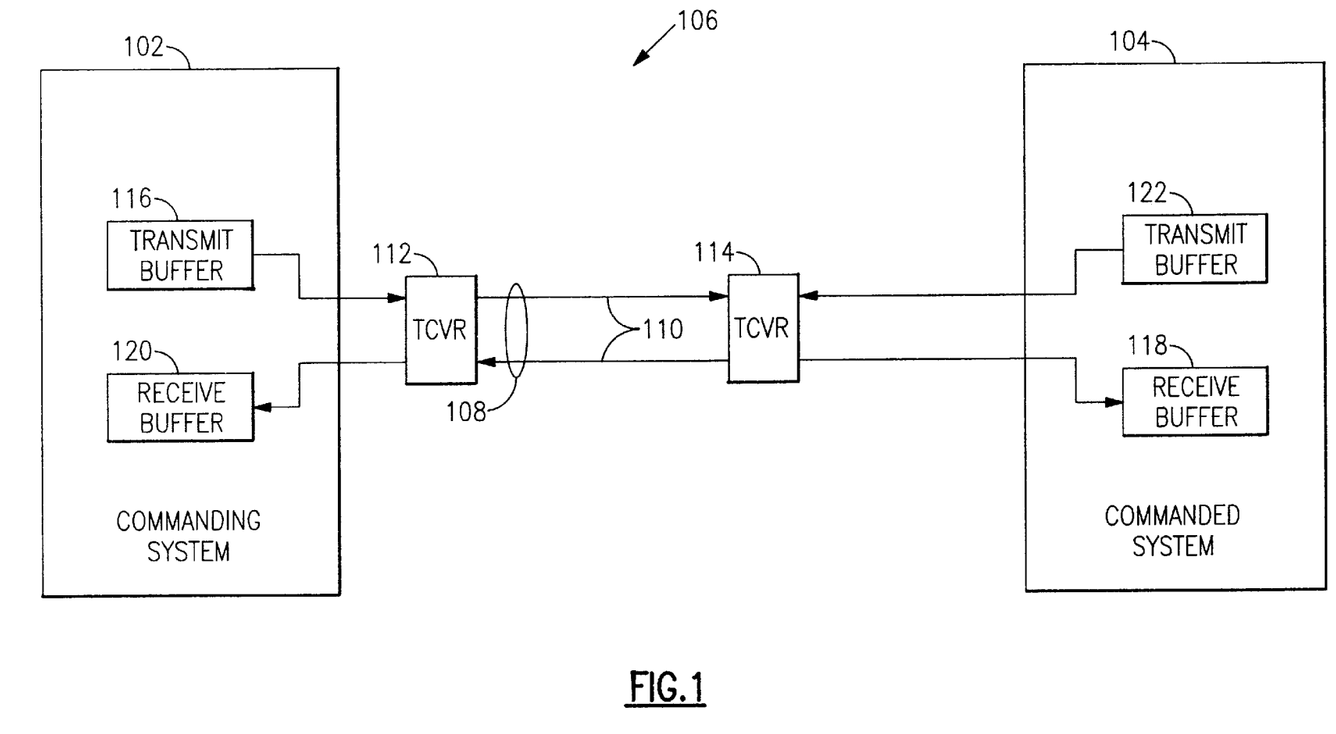
FIG. 1 is a general illustration of a commanding system and a commanded system.

Description of the Link Protocols used for Message Passing in the Detailed Embodiment The environment used by the preferred embodiment is shown in FIG. 1, which shows a physical channel link 106 for communicating data between two computing elements 102, 104. Elements 103, 104 may be, for example, computer systems, or high speed controller devices such as used with electronic storage entities. The computing elements 102, 104 are connected by way of an intersystem channel link 106 comprising a fiber optic link 108 formed of a fiber transmission line pair 110. The fiber pair 110 consists of two optical fibers, one for transmitting information and one for receiving information. The fiber pair 110 is coupled to the computing elements 102, 104 by way of transceivers (TCVR) 112, 114 located at opposite ends of link 108. Each of the transceivers 112, 114 includes a transmitter unit and a receiver unit.

All of the data traffic transmitted over the fiber optic bus 108 supports message passing between the computing elements 102, 104. One type of message is a command sent from computing element 102 to computing element 104. The command may request optional data to be transferred between computing elements 102, 104. In any event, after the command has been executed, including the transfer of any data, the commanded computing element 104 sends a response frame to computing element 102.

The preferred embodiment is implemented in hardware/microcode in a commanding computing element (processor) 102 that sends commands to a commanded computing element (processor) 104 and receives response messages back from the commanded processor 104. Messages consist of commands, optional data, and responses, and are stored in buffers located in both computing elements. To transfer a command, data, and response, transmit buffers 116 and 122 and receive buffers 118 and 120 are used in the computing elements 102 and 104. The transmitting buffers 116 and 122 may be located anywhere in their respective computing elements 102 and 104, including in their main memory.

The receive buffers 118 and 120 must at all times be immediately accessible by the transceivers 112 and 114. Therefore, the receive buffers 118 and 120 are implemented as arrays dedicated to the intersystem channel, and they are not in their respective main processor memory which is shared among many different elements within the respective computing elements 102 and 104.

Figure 2:
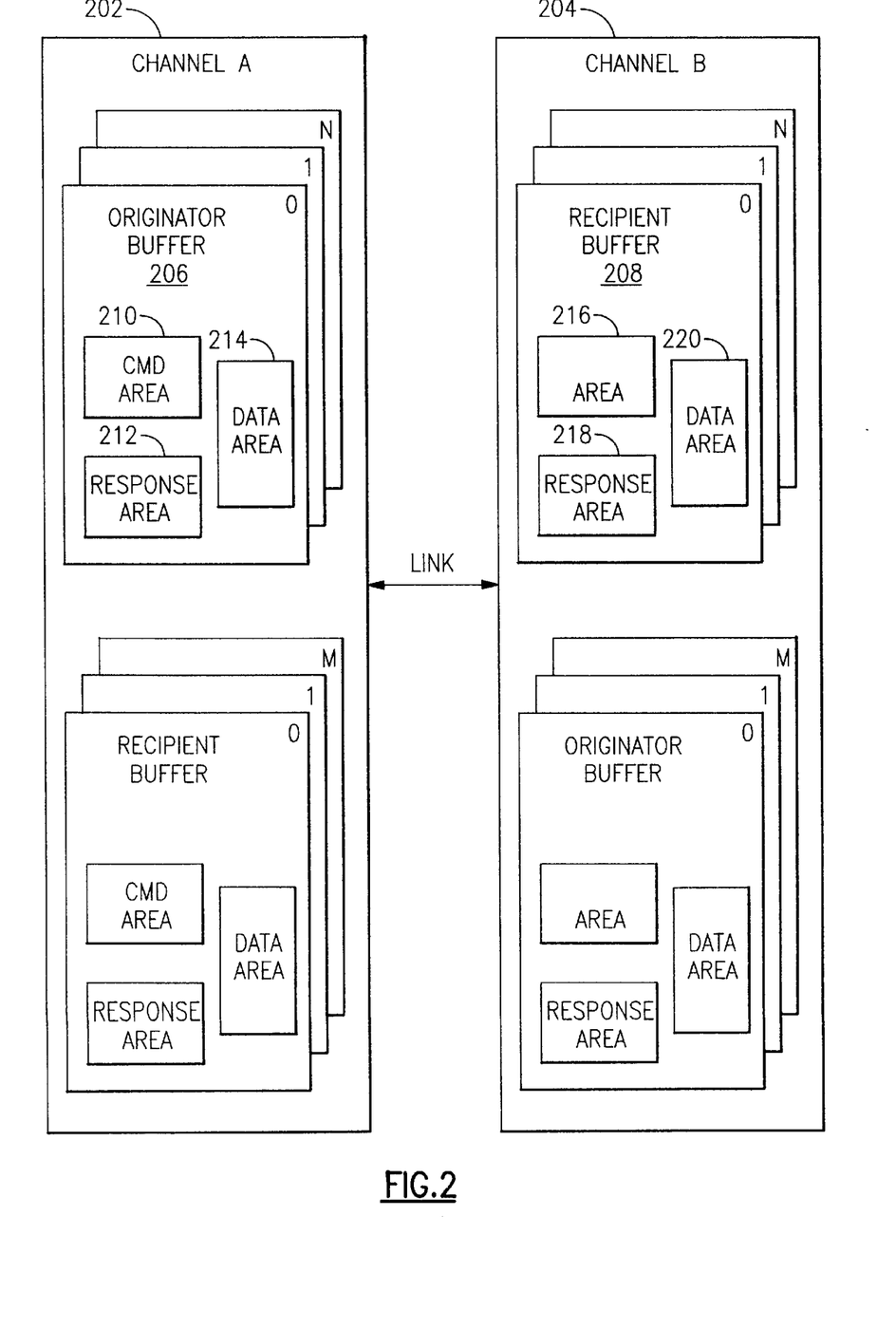
FIG. 2 is a representation of a multi-message channel buffer structure.

Processing a complete message with data uses buffers in both computing elements 102, 104. The computing element that initiates the message is the originator or commanding system, and the computing element that processes the message is the recipient or commanded system. FIG. 2 shows multiple buffers on both sides of a link. For example, to pass a message with data from Channel A 202 to Channel B 204 requires the Channel A originator buffers shown in block 206, and the Channel B recipient buffers shown in block 208. Each group of buffers in blocks 206, 208 are called a "buffer set". There are N number of buffer sets in each of channels 202 and 204, in which the buffer sets are labeled 1-N. When a message is sent, the originator buffer command area 210 is loaded with the command, and the command is sent over the link to the recipient buffer command area 216. If data is to be transferred, it is either sent from originator buffer data area 214 to recipient buffer data area 220 for a write operation, or it is sent from recipient buffer data area 220 to originator buffer data area 214 for a read operation. After the optional data transfer, sometimes requiring more than one link data block with more than one exchange of frames on the link, the response is loaded into the recipient buffer response area 218 and sent across the link to the originator buffer response area 212.

Information is transferred from one side of the link to the other in frames. This information is always targeted to a particular buffer area, and the targeting information is contained in a link-control word of the frame. This targeting information allows the frames to be multiplexed over the link in any order, and the buffer sets may send/receive frames in any order over the link. As an example, returning to FIG. 2, Channel A 202 could send a command from its buffer set 1 followed by write data sent from buffer set 0, followed by a response being received by buffer set 0, etc. It should be understood that a computing element can dynamically set up various numbers of originator and/or recipient buffers depending on the number and type of links to be established.

Figure 3:
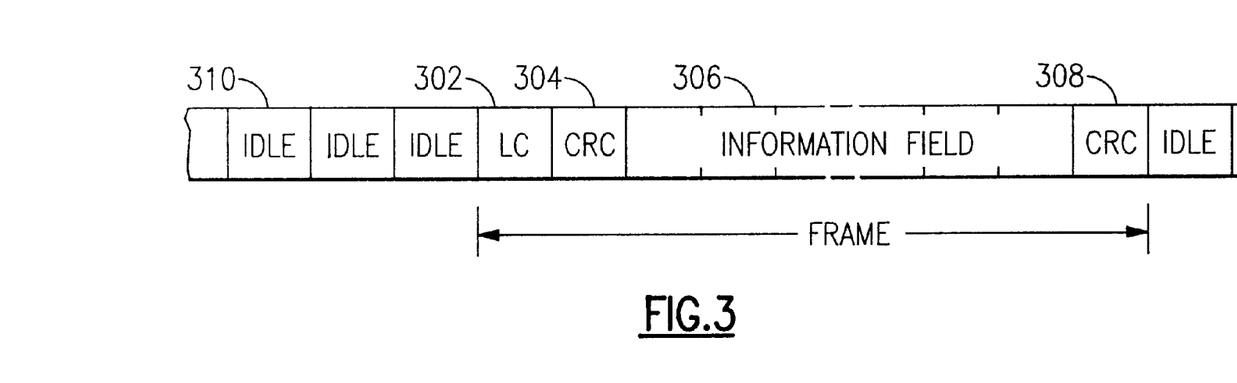
FIG. 3 is a representation of the format of an exemplary communication frame.
Figure 4:
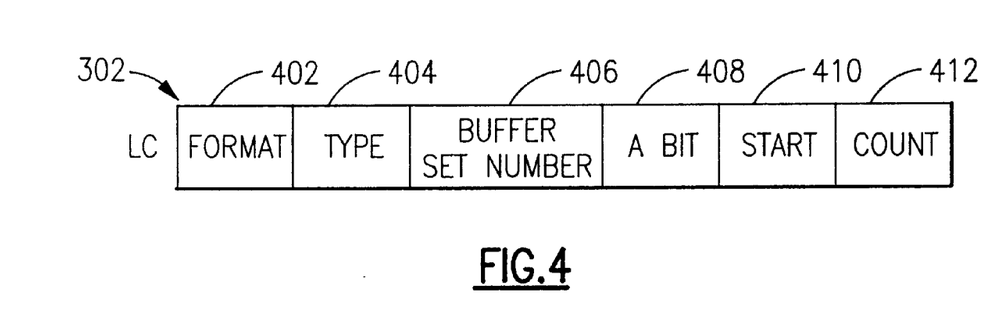
FIG. 4 is a representation of the contents of a Link Control Word.

The frame format used in this embodiment is illustrated in FIG. 3. When no information frames are being transmitted, idle words 310 are continuously sent on the link. When information frames are transmitted, they start with a data word which is link-control word (LC) 320. FIG. 4 shows various fields in link-control word 302 which identify the frame format and type, designate a buffer set area (number), and control the state of the transceiver and link.

A link-control-CRC (cyclical redundancy check) word 304 follows the link-control word. The link-control CRC word 304 is conventionally generated from the values in the link-control word. The link-control CRC word is checked at the receiver to test the validity of the link-control word in the incoming frame.

There are two general types of frames, frames with and without information fields. Some control frames do not have an information field. All frames have a link-control word and a link-control CRC word. An information frame has a link-control word 302 a link-control CRC word 304 and an information field 306. Information field 306 contains, for example, from one to 1,024 words. The information field contains the information sent from a buffer set area at one end of the link to a buffer set area at the other end. An information field 306 is followed by an information-field CRC word 308. The information-field CRC word is conventionally generated from the values in the information field. The information field CRC word is checked at its receiver to test the validity of the information field in the incoming frame.

FIG. 4 shows details of the link-control word 302. The format 402 field indicates if the frame contains an information field 306. Command control frames, response control frames, and data frames each have an information field. But acknowledgement control frames and reject control frames do not have an information field. A "type" field 404 specifies if the frame is a command, response, or data frame. The buffer set number 406 specifies which buffer set is the target. The A bit 408 has two uses. In a command frame, the A bit indicates that one or more data frame(s) are to follow (a write operation). In a response frame, the A bit indicates that one or more data frame(s) preceded the response (a read operation). In a data frame, the A bit indicates that more data frame(s) are to follow.

Figure 5:
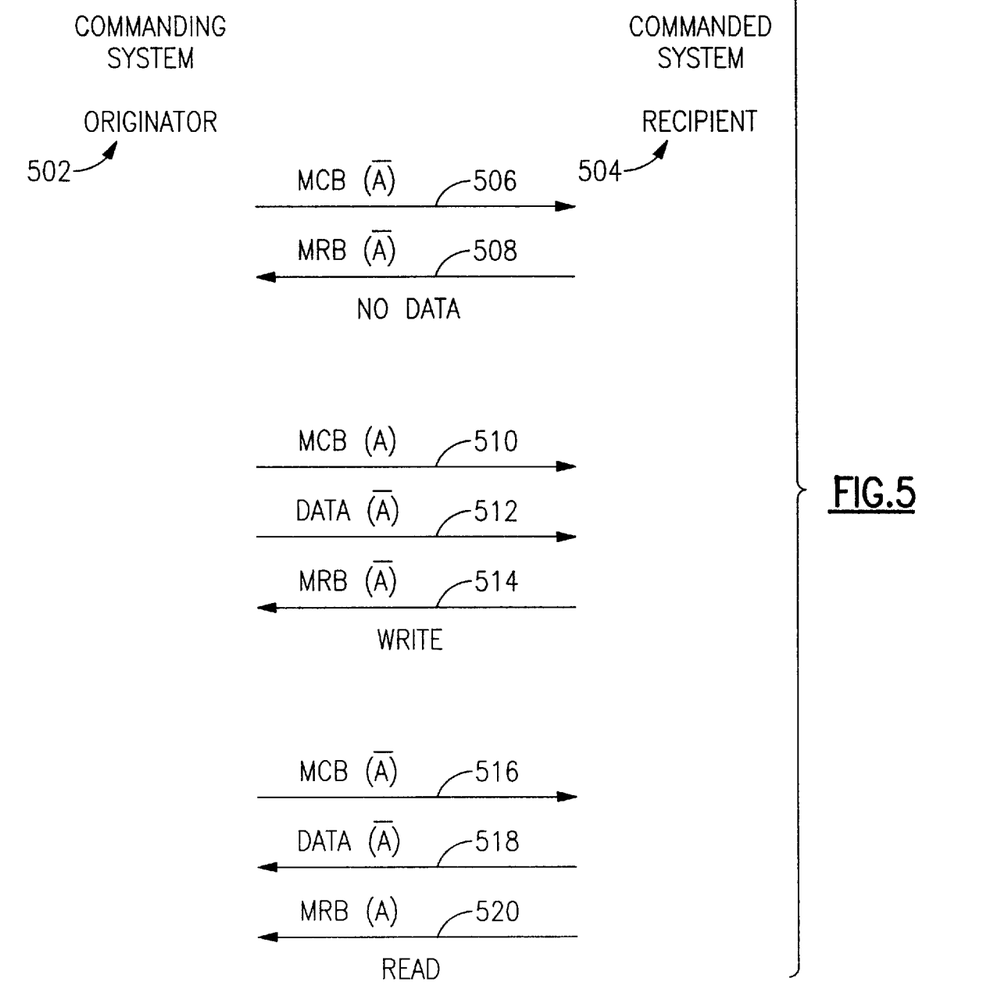
FIG. 5 is a representation of communication sequences of command, data, and response frames on a link between commanding and commanded systems.

Although they do not have sequence numbers, each frame is largely interlocked with its subsequent and previous frames. The interlocking is accomplished by the protocol on the link. For example, each message for a particular buffer set may start with a command, followed by data, followed by a response. Each of these types of transmissions has a unique link-control word since each transmission is targeted to differing buffer set areas. FIG. 5 illustrates such protocols.

FIG. 5 shows three operational examples of how the A bit field may be set. The first "no data" example represents a command frame transmission followed by a response frame transmission with no associated data frame transfer. In this example, an originator (commanding system) 502 sends a command in a Message Command Block (MCB) frame 506. The LC 302 for this frame has its A bit 408 set to zero (shown as no line over the A) since there is no data to follow. After the command has been processed, the recipient (commanded system) 504 sends a response frame as a Message Response Block (MRB) frame 508. The LC in this frame also has its A bit set to zero since there was no data preceding the response.

The second example in FIG. 5 is a "write" operation using a single link data block frame. In this case the MCB 510 has its A bit set to one (shown as a line over the A) since there is at least one link data block frame to follow. After the MCB, the originator sends the link data block (DATA FRAME) 512. The A bit in this data frame is set to zero because there are no more link data blocks to follow. After the recipient processes the command and its associated data, it sends a response frame, an MRB frame 514. The A bit in the MRB frame is set to zero since there was no data preceding the response frame.

The third and last example in FIG. 5 is a "read" operation using a single link data block frame 518. In this case the MCB frame 516 has its A bit set to zero since there are no link data blocks to follow. The recipient processes the command and returns the link data block (DATA frame) 518. The A bit in this DATA frame is set to zero because there are no more data areas to follow. After the recipient sends the DATA frame, it sends the response (MRB) frame 520. The A bit in this MRB frame is set to one since there was at least one link data block frame preceding the response frame.

To enable an understanding of the detailed embodiment, only one operation for a single buffer set is described in the examples of FIG. 5, but multiple buffer sets 1-N as shown in FIG. 2 are being multiplexed over the link at the same time in the manner well known in the art, in which traffic on the link consists of interleaved frames sent for the multiple buffer sets 1-N.

Returning to FIG. 3, the LC 302 and the information field 306 have independent error checking by means of their separate CRC check characters. This conventional checking is provided by encoding the data for serial transmission (e.g. using the 8 bit/10 bit code) for each CRC 304 and 308. Transmission errors usually affect only a few bits at a time and it is unlikely that a transmission error would damage both the LC word and the information field of the same frame. If the LC word is in error, the entire frame is considered lost since the receiver must have the LC word to know the frame type and the buffer set number. If the LC word is not in error and only the information field is in error, the LC word provides the receiver of the damaged frame with enough information to ask the sender to retransmit the damaged frame. Since the information field is usually much longer that the LC word, there is a higher chance that a transmission error will affect the information field and not the LC word. This means that most transmission errors affecting a frame can be retried using the information supplied by the LC word.

Figure 6:
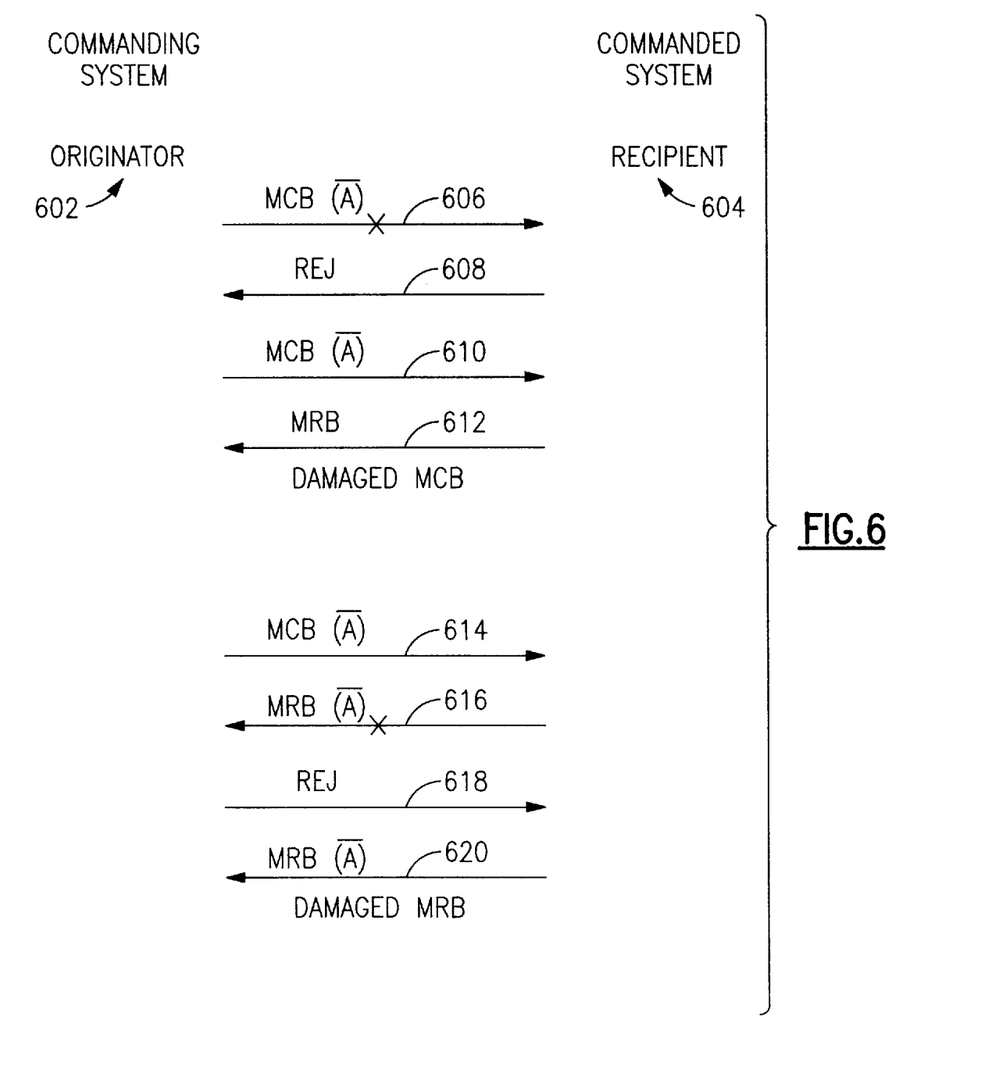
FIG. 6 is a representation of communication sequences on a link where the content of either the command frame or the response frame is damaged.

FIG. 6 shows examples of errors occuring in transmitted frames. The first illustrated example represents a damaged command frame (MCB frame 606), while the second illustrated example represents a damaged response frame (MRB frame 616). In the first example, the originator 602 sends the MCB frame 606 to the recipient 604. The recipient detects the error, indicated by an "X" on the arrow representing the MCB 606 frame, and responds by sending a Reject (REJ) 608 frame back to the originator requesting the MCB frame to be retransmitted. The originator resends MCB frame 610. In the second example, the recipient 604 sends an MRB frame 616 to the originator 602. The originator detects the error, as indicated by the "X" on the arrow representing the MRB 616 frame, and sends a Reject (REJ) 618 frame back to the recipient requesting the MRB frame to be retransmitted. The recipient resends the MRB frame 620.

Figure 7:
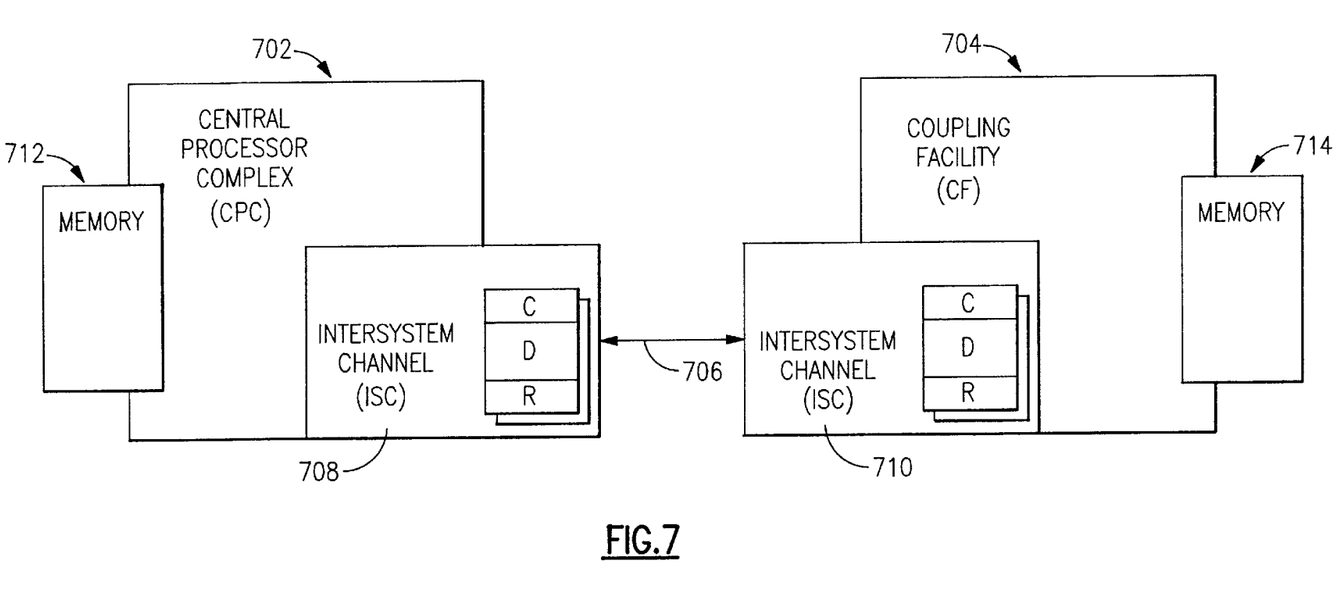
FIG. 7 is an illustration of a central processing complex connected to a coupling facility.

FIG. 7 shows a central processor complex (CPC) 702 connected to a coupling facility (CF) 704 by an intersystem channel (ISC) link 706. The central processor complex 702 contains a intersystem channel 708 that is the commanding system for a sequence of frames (MCB and optional DATA) sent over the intersystem channel link 706. The coupling facility 704 is the commanded system which contains an intersystem channel 710 that responds with a response frame (MRB) over the intersystem channel link. Both the central processing complex 702 and the coupling facility 704 each contain a respective memory 712 or 714.

Description of the Central Processing Complex

Figure 8:
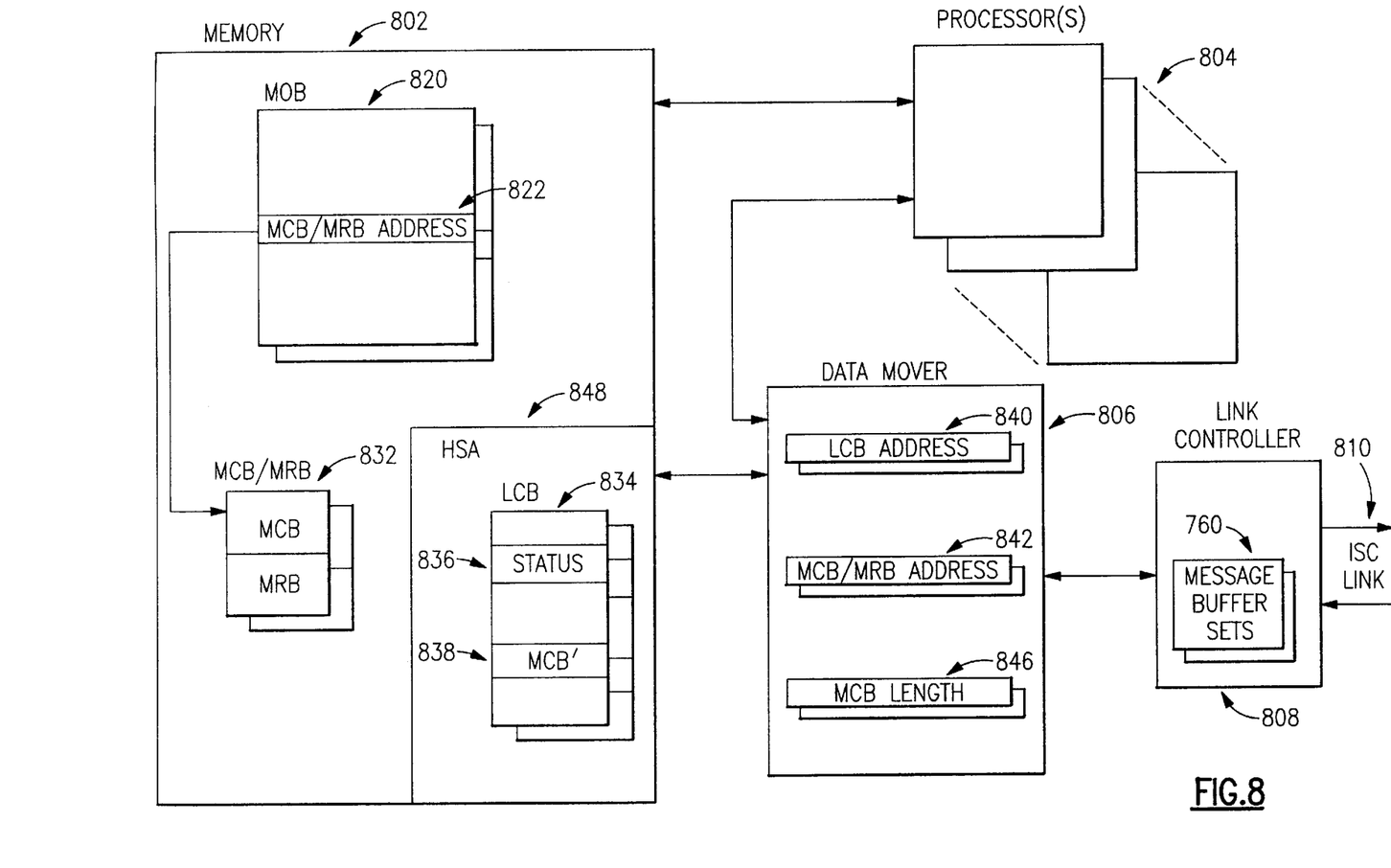
FIG. 8 is an illustration of the internals of the central processing complex showing the control blocks and link hardware used in message passing.

The preferred embodiment provided herein of the subject invention provides and uses special hardware and microcode in the central processing complex (CPC) shown in FIG. 8. The CPC internals include a memory 802 connected to one or more processors 804 which may be either CPUs (central processing units) or SAPs (support auxiliary processors). The intersystem channel (ISC) includes data mover 806, which is connected to both the memory 802 and the processor(s) 804. The data mover 806 is connected to a link controller 808, which is connected to an intersystem channel link 810 that connects at its other end to a coupling facility.

The CPC is initialized before programs in the CPC can execute, during which they may send messages to a coupling facility (CF) by using the S/390 SEND MESSAGE (SM) instruction, which is in the prior art. Before executing the SM instruction for sending any messages on the ISC link, a number of blocks of control and optional data information need to be setup in the CPC storage and in the data mover 806, and a particular buffer set needs to be specified from the buffer sets 1-N in CPC memory 802. Among the control blocks needing initialization is link control blocks (LCBs) 834. Data mover 806 is prepared by loading into its LCB ADDRESS registers 840 the memory addresses of the LCBs. Each buffer set is also designated as a "subchannel", and each buffer set has one LCB 834, which contains several fields including a status area 836 and an MCB copy area, called the MCB' area 838. When the LCB ADDRESS registers 840 are initialized, the data mover 806 has access to some of the information required to send messages.

Also before the SEND MESSAGE instruction can be executed, a CPC preparatory program sets up additional control blocks in memory 802. The preparatory program stores the command in the MCB part of an area of memory called the MCB/MRB area 832. In the present embodiment, the MCB/MRB area is 512 bytes with the first 256 bytes allocated to the MCB part. A second 256 byte part of area 832 is allocated and reserved for a future message response block. The preparatory program also builds a message operation block (MOB) 820 which contains several addresses including an address of the MCB/MRB area 832, called the "MCB/MRB ADDRESS" 822. Optional message data block(s) may also be set up in memory 802, and they will also have their memory addresses stored in registers in data mover 806.

After the message control blocks and data blocks have been set up in memory 802, the CPC program issues a SEND MESSAGE instruction (which is an instruction generally known in the prior art for communicating to CFs). A CPC processor executes the SEND MESSAGE (SM) instruction having parameters, including a subchannel number, and other operand information in memory (not shown) that are used to select an intersystem channel port and a buffer set (a subchannel). The subchannel is specified in the SM instruction, which determines the buffer set. The CPC processor copies the MCB from the MCB/MRB area 832 in memory to the MCB' area 838 in the appropriate LCB 834. After the MCB has been copied into the LCB 834, an MCB header 839 is written into the LCB 834.

During execution of the SEND MESSAGE instruction, the CPC processor sends a command to the data mover 806 containing the required buffer set number and the address of the required MCB/MRB area 832 in memory, and the length of the MCB.

In the data mover 806, the address of the MCB/MRB area 832 is loaded into the MCB/MRB ADDRESS register 842, the length of the MCB is loaded into the MCB length register 846, and the data mover is now prepared for the receipt of the MRB. The CPC processor will not be required to move the MRB into memory, and it is now free to do other work. The data mover then uses the contents of the LCB ADDRESS register 840 to fetch the MCB from the MCB' area 838 in the LCB 834 in memory. When the MCB arrives from the memory 802, it is transmitted through the link controller 808 and over the link 810.

After any optional data has been transferred, the coupling facility sends the response in an MRB. When the MRB is received by the link controller 808, it signals the data mover 806. The data mover then uses the contents of the MCB/MRB ADDRESS register 842 to store the MRB into the second half of the MCB/MRB area 832 in memory 802. If the MRB is moved into memory successfully, the data mover 806 uses the contents of the LCB ADDRESS register to write the appropriate status into the status area 836 of the LCB 834. The CPC program that originally issued the SEND MESSAGE instruction is notified of its completion either through poling the LCB status area 836 or through an interrupt (not shown).

Figure 10:
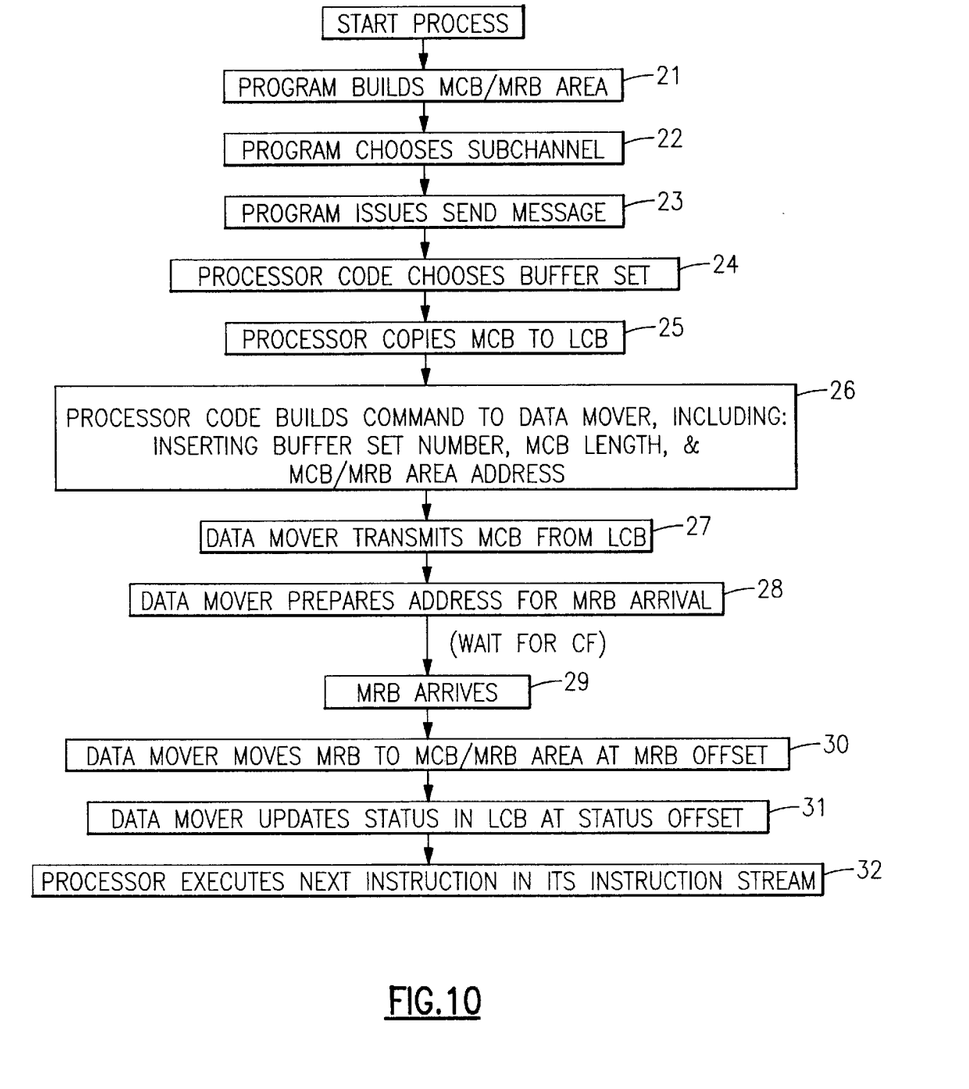
FIG. 10 is a flow diagram of a detailed method used by the subject invention.

FIG. 10 shows the method used by the preferred embodiment, which includes a step 21 in which a preparatory program builds the MCB/MRB area. Then in step 22 the program chooses the subchannel containing the buffer set being used for preparing the operands of the SM command to be issued. In step 23 the program issues the SM instruction which generates the SM command. Step 24 chooses the buffer set using the subchannel information previously provided.

In step 25, the processor copies the MCB to the MCB' area in the LCB. Step 26 comprises microcode in which the processor builds the SM command to the data mover, including inserting the buffer set number, MCB length and MCB/MRB area address.

In step 27, the data mover transmits the MCB from the LCB, and in step 28 the data mover prepares the address for the MRB arrival from the CF, and waits for its arrival. The MRB arrives in step 29, and in step 30 the data mover moves the MRB to the MCB/MRB area at the MRB offset in that area. The method is now completed which is signalled to the processor executing the SM command to indicate completion so that the processor may then start executing its next instruction in its instruction stream.

Description of Recovery from Link Bit Errors

As shown in FIG. 6, when a link error is detected in an MCB 606 or an MRB 616, a Reject signal 608, 618 is sent back to the transmitter of the damaged frame, and the frame is resent.

When the Reject frame 608 for an MCB is received by a sender intersystem channel, the link controller 808 sends a signal to the data mover 806 to resend the MCB. The data mover again uses the contents of the LCB ADDRESS register 840 to fetch the MCB from the MCB' area 838 in the LCB 834 in memory. When the MCB arrives from the memory 802, it is retransmitted through the link controller 808 and over the link 810, as shown by the second MCB 610 in FIG. 6. The retransmission of the MCB is hardware controlled by the data mover and occurs without any knowledge or assistance by any CPC processor.

Figure 9:
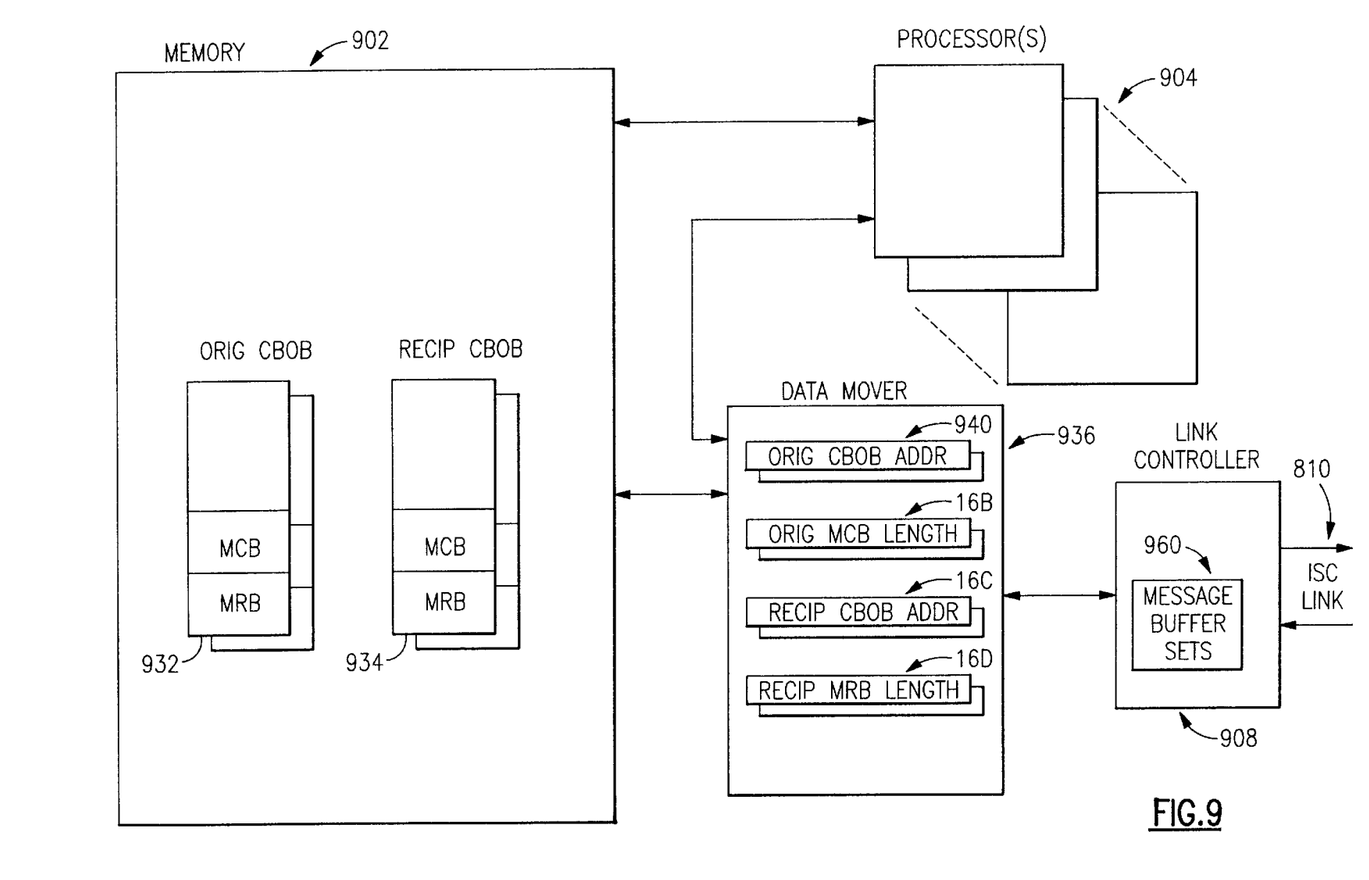
FIG. 9 is a block diagram of a CF (including the CF memory and processors), a link controller for use by a CF intersystem channel (ISC) link, and a data mover for controlling link communications of the ISC between the CF and another computing element.

In FIG. 9, a transceiver intersystem channel in the coupling facility handles the MCBs and MRBs using the same hardware described above for the CPC, but the CF operates in a different mode. FIG. 9 illustrates pertinent hardware in the CF processor used by the preferred embodiment. In a similar fashion to the CPC, when a Reject frame 618 is received by the CF receiver channel, the link controller 908 sends a signal to the CF data mover 906 to resend the MRB. The data mover again uses the contents of an LCB ADDRESS register 840 (called the CBOB (Channel Buffer Operation Block) ADDRESS register in the coupling facility) to fetch the MRB from the CBOB in memory. When the MRB arrives from the memory 902, it is retransmitted through the link controller 908 and over the link 810, as shown by the last MRB 620 in FIG. 6. The retransmission of the MRB occurs without any knowledge or assistance by any coupling facility processor.

Having thus described our invention, what we claim as new and desire to secure by Letters Patent is:

1. A method of handling link response frames responding to command frames sent on a link by a commanding computer system to a commanded computer system, comprising the steps of:

preparing by a processor in the commanding computer system blocked areas in a memory of the commanding computer system for use by a data mover implemented in hardware of the commanding computer system, the blocked areas including: a message command block (MCB) and a message response block (MRB), a link control block (LCB), and assigning the areas to a subchannel for use by a send message instruction to be issued by the commanding computer system, issuing of a send message (SM) instruction by the processor, including a SM command to the data mover, and the data mover sending to the commanded computer system a command frame on the link containing command information prepared in the area assigned to the subchannel, receiving the command frame by the commanded computer system, preparing by the commanded computer system a response frame indicating status of response to a command received in the command frame, and sending a response frame on the link to the commanded computer system, receiving the response frame by the data mover at the commanding computer system, and processing the response frame for error conditions and moving information from the response frame to the commanding system memory for access by the program issuing the command resulting in the response frame, and signalling by the data mover to an available processor in the commanding computer system of a completion of execution of the SM instruction, for which the data mover accesses and stores information in a link control block (LCB) in a memory of the commanding computer system using an LCB address in a register of the data mover.

2. A method of handling link response frames responding to command frames sent on a link by a commanding computer system to a commanded computer system, comprising the steps of:

preparing by a processor in the commanding computer system blocked areas in a memory of the commanding computer system for use by a data mover of the commanding computer system, the blocked areas including: a message command block (MCB) and a message response block (MRB), a link control block (LCB), and assigning the areas to a subchannel for use by a send message instruction to be issued by the commanding computer system, issuing of a send message (SM) instruction by the processor, including a SM command to the data mover, and the data mover sending to the commanded computer system a command frame on the link containing command information prepared in the area assigned to the subchannel, receiving the command frame by the commanded computer system, preparing by the commanded computer system a response frame indicating status of response to a command received in the command frame, and sending a response frame on the link to the commanded computer system, receiving the response frame by the data mover at the commanding computer system, and processing the response frame for error conditions and moving information from the response frame to the commanding system memory for access by the program issuing the command resulting in the response frame, signalling by the data mover to an available processor in the commanding computer system of a completion of execution of the SM instruction, copying an address of the MCB/MRB area into a register in a data mover operating with a link controller in the commanding computer system for indicating to the data mover a memory location for storing response data to be obtained from the response frame, whereby central processors in the commanding computer system are freed of being involved in direct transmission link operations.

3. A method of handling link response frames responding to command frames sent on a link by a commanding computer system to a commanded computer system, comprising the steps of:

preparing by a processor in the commanding computer system blocked areas in a memory of the commanding computer system for use by a data mover of the commanding computer system, the blocked areas including: a message command block (MCB) and a message response block (MRB), a link control block (LCB), and assigning the areas to a subchannel for use by a send message instruction to be issued by the commanding computer system, issuing of a send message (SM) instruction by the processor, including a SM command to the data mover, and the data mover sending to the commanded computer system a command frame on the link containing command information prepared in the area assigned to the subchannel, receiving the command frame by the commanded computer system, preparing by the commanded computer system a response frame indicating status of response to a command received in the command frame, and sending a response frame on the link to the commanded computer system, receiving the response frame by the data mover at the commanding computer system, and processing the response frame for error conditions and moving information from the response frame to the commanding system memory for access by the program issuing the command resulting in the response frame, signalling by the data mover to an available processor in the commanding computer system of a completion of execution of the SM instruction, copying an address of the MCB/MRB area into a register in a data mover operating with a link controller in the commanding computer system for indicating to the data mover a memory location for storing response data to be obtained from the response frame, whereby central processors in the commanding computer system are freed of being involved in direct transmission link operations, processing by the data mover of control operations on the response frame including checking for error condition in the transmission of the response frame by using error checking fields therein, requesting by the data mover to the commanded computer system for a retransmission of the response frame for obtaining a retransmission of the response frame, and performing the completion signalling step by the data mover only when a successful reception is obtained of the response frame, whereby the central processors in the commanding computer system are not involved in direct transmission link operations.

* * * * *